E. R. NASH.
WELDING TORCH.
APPLICATION FILED JULY 20, 1916.
1,230,204.
Patented June 19, 1917.
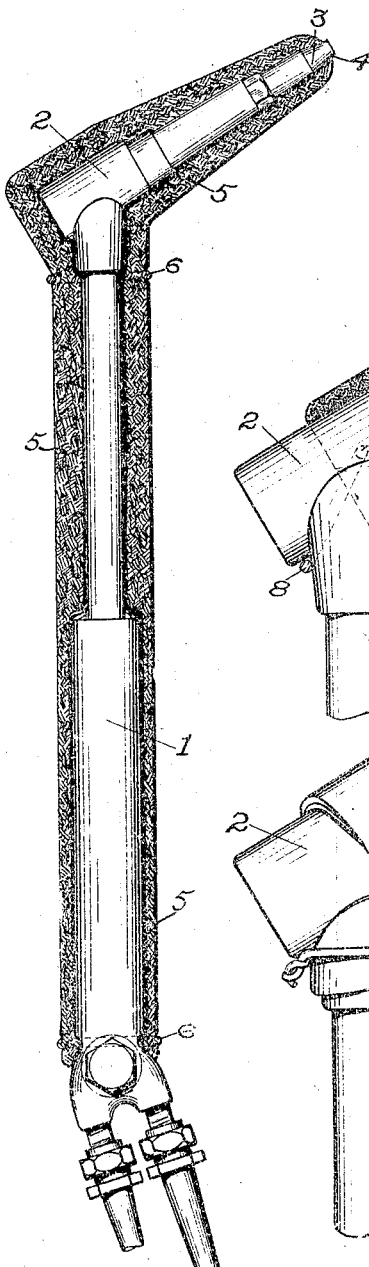
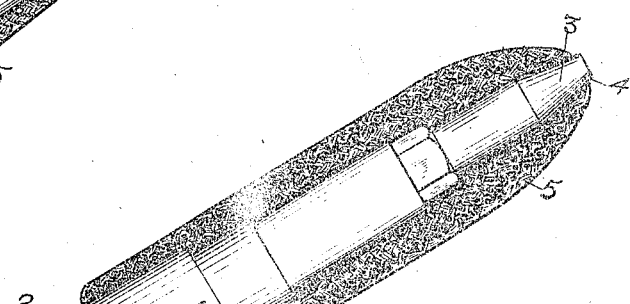
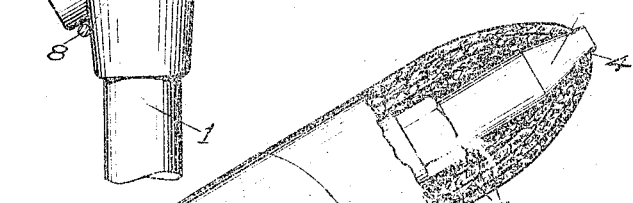
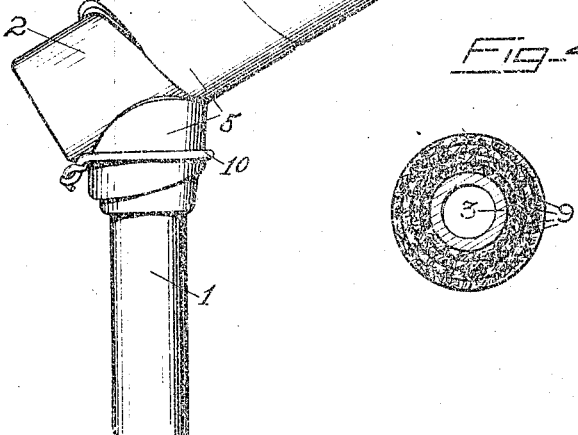
WITNESSES
INVENTOR.
Evan Rupert Nash

UNITED STATES PATENT OFFICE.

EVAN RUPERT NASH, OF HANFORD, CALIFORNIA.

WELDING-TORCH.

1,230,204.  Specification of Letters Patent.  Patented June 19, 1917.

Application filed July 20, 1916. Serial No. 110,376.

*To all whom it may concern:*

Be it known that I, EVAN R. NASH, a citizen of the United States, residing at Hanford, in the county of Kings and the State of California, have invented a new and useful Improvement in Welding-Torches Which are Used for Autogenous or Fusion Welding, Brazing, or other Similar Operations, and the objects of my improvement are—

First, to prevent overheating of the torch as a whole or the tip or welding head only.

Second, to prevent the ignition of the gases before leaving the tip.

Third, to increase the life of the tip or welding head.

I attain these objects by the device shown on the accompanying drawing which consists of a sheath or jacket or covering of fire-proof non-heat conducting material.

Figure 1. is a view of a welding torch with modified form of my invention shown in section covering the whole torch without wire reinforcement.

Fig. 2. is a view of the welding head only fitted with preferred form of my invention shown in section covering the welding head and tip.

Fig. 3. is a broken sectional view of a welding head with a modified form of my invention shown in section covering the welding head and tip.

Fig. 4, is a transverse sectional view through the burner-head, illustrating the laminations of fire-proof material forming the protecting sheath.

Similar letters refer to similar parts throughout the several views.

With reference more particularly to the drawing 1. is the body of the torch. 2. is the welding head, 3. is the tip, 5. is the sheath, jacket or covering of fire-proof heat insulating material, 6, 8 and 10 are the clips, wires, or other fastening used to detachably hold the jacket in place.

The preferred fire-proof heat insulating material is asbestos or the like, preferably reinforced or strengthened by the metallic wires or fabric 7 embedded therein.

Fig. 1. shows an entire torch covered with my fire-proof insulating material molded in halves and applied, in which 1. is the body of the torch, 2. the welding head, 3. the tip, 5. the insulating material inclosing the tip and extending to the nose thereof, 6. the fastenings.

Fig. 2. shows my preferred form in which 1. is the body of the torch, 2. the welding head, 3. the tip, 5. the fire-proof sheath of insulating material surrounding the same and being molded in one piece and applied by being slipped over the welding head, 7. is a metal reinforcement preferably a metallic fabric formed of iron wire and which serves as a strengthening medium for the asbestos body, 8. is the fastening to hold the jacket upon the torch.

Fig. 3. illustrates the head and tip of a torch protected by a further modified form of fire-proof sheath and wherein the reinforced material 5, is formed in a strip and is wound about the head and tip to the nose thereof to form a built up or laminated sheath, the free ends of which, are retained in position by the fastening wire 10.

In the constructions illustrated, I have provided a structure in the form of a fire-proof sheath or shell surrounding the torch head or tip and extending to the nose of the latter, the sheath preventing the propagation of heat into the interior of the torch, thus overcoming the defects of the torches of this type now on the market, in which during the use, the high temperature, due to the radiation of the welding heat, becomes propagated into the interior of the torch and causes the explosion of the gas therein before the same leaves the tip thereof. It is apparent, that the sheath is capable of ready removal from the torch to admit of the repairing thereof, is light in weight and does not interfere in any way with the manipulation of the torch during the welding process.

I am aware that torches have been made with water jackets to prevent overheating but these are very heavy and require four lines of hose thereby making them very cumbersome and hard to manipulate. I therefore do not claim broadly a torch that will not overheat.

I claim:

A detachable fire-proof protector for welding torches, comprising a molded tubular sheath of refractory heat insulating material for positioning on the torch head over the burner tip end thereof and for closely surrounding and inclosing the said head and when in position extending from a point adjacent the rear of said head to the nose of the burner tip, and means for engaging said sheath for securing the same in position on the head.

EVAN RUPERT NASH.

Witnesses:
  HORACE LEMON,
  EDWARD CECIL.